(12) United States Patent
Yuasa et al.

(10) Patent No.: US 6,666,794 B2
(45) Date of Patent: Dec. 23, 2003

(54) APPARATUS AND METHOD FOR CONTROLLING AUTOMATIC TRANSMISSION

(75) Inventors: Hiroyuki Yuasa, Atsugi (JP); Yoshikazu Tanaka, Atsugi (JP)

(73) Assignee: Unisia Jecs Corporation, Kanagawa-ken (JP)

( * ) Notice: Subject to any disclaimer, the term of this patent is extended or adjusted under 35 U.S.C. 154(b) by 0 days.

(21) Appl. No.: 09/945,705

(22) Filed: Sep. 5, 2001

(65) Prior Publication Data
US 2002/0028728 A1 Mar. 7, 2002

(30) Foreign Application Priority Data

Sep. 5, 2000 (JP) .......................... 2000-268997
Sep. 5, 2000 (JP) .......................... 2000-268998

(51) Int. Cl.$^7$ .......................... F16H 61/00; F16H 61/04
(52) U.S. Cl. .......................... 477/117; 477/150
(58) Field of Search .................. 477/117, 143, 477/150, 151, 152, 156, 158, 161, 98; 475/117, 120

(56) References Cited

U.S. PATENT DOCUMENTS

| | | | | |
|---|---|---|---|---|
| 5,128,868 A | * | 7/1992 | Imai et al. | 74/866 X |
| 5,583,768 A | * | 12/1996 | Hamajima et al. | 477/120 X |
| 5,857,935 A | * | 1/1999 | Takiguchi | 475/120 |
| 5,865,702 A | * | 2/1999 | Yokoyama et al. | 475/117 |
| 5,876,304 A | * | 3/1999 | Takiguchi | 47/150 |
| 5,913,748 A | * | 6/1999 | Takiguchi | 477/151 X |
| 6,041,275 A | * | 3/2000 | Takiguchi | 475/120 X |

FOREIGN PATENT DOCUMENTS

| | | |
|---|---|---|
| JP | 05-039843 | 2/1993 |
| JP | 07-012210 | 1/1995 |
| JP | 11-030324 | 2/1999 |
| JP | 2000-055180 | 2/2000 |

\* cited by examiner

*Primary Examiner*—Roger Pang
(74) *Attorney, Agent, or Firm*—Sughrue Mion, PLLC (57) ABSTRACT

When a racing of engine occurred during a speed change, an oil pressure is forcibly supplied to a friction engagement element to be released, and a back pressure of an accumulator disposed in an oil supply pipe of this friction engagement element of release side is increased in stepwise.

21 Claims, 11 Drawing Sheets

| | L/C | L&R/B | 2&4/B | H/C | R/C | L/OWC |
|---|---|---|---|---|---|---|
| 1 | ○ | ● | | | | △ |
| 2 | ○ | | ○ | | | |
| 3 | ○ | | | ○ | | |
| 4 | | | ○ | ○ | | |
| R | | ○ | | | ○ | |

○ ENGAGED
● ENGAGED FOR ONE RANGE
△ ENGAGED FOR DRIVE

| GEAR POSITION \ SOLENOID | SHIFT SOLENOID (A) | SHIFT SOLENOID (B) |
|---|---|---|
| 1-SPEED | ON | ON |
| 2-SPEED | OFF | ON |
| 3-SPEED | OFF | OFF |
| 4-SPEED | ON | OFF |

APPARATUS AND METHOD FOR CONTROLLING AUTOMATIC TRANSMISSION

FIELD OF THE INVENTION

The present invention relates to an apparatus for and a method of controlling an automatic transmission, particularly to the technology of restraining a racing during a speed change.

BACKGROUND OF THE INVENTION

There has been known a conventional automatic transmission constructed to perform a speed change by a friction engagement element replacement for carrying out simultaneously an engagement control and a release control of two friction engagement elements.

As an apparatus for controlling a speed change of the above construction, as disclosed in Japanese Unexamined Patent Publication No. 11-030324, there is known a construction where an accumulator is disposed in piping for supplying oil pressure to each friction engagement element, and a back pressure of the accumulator is controlled, thereby restraining a change speed of the oil pressure.

Technologies to restrain an occurrence of a racing during speed change are disclosed in Japanese Unexamined Patent Publication Nos. 7-012210, 5-039843, and 2000-055180.

In the technology disclosed in Japanese Unexamined Patent Publication No. 7-012210, a rise in oil pressure in an engagement side friction engagement element is detected by a pressure switch and drain timing of oil pressure in a release side friction engagement element is determined based on the detection result.

In the technology disclosed in Japanese Unexamined Patent Publication No. 5-039843, an oil pressure of a release side friction engagement element is increased when a slip amount of the release side friction engagement element is a threshold value or above, while the oil pressure is decreased when a variation ratio of the slip amount is 0 or less.

Further, in the technology disclosed in Japanese Unexamined Patent Publication No. 2000-055180, a stroke completion in the engagement side friction engagement element is estimated and a decrease in line pressure is started in accordance with the stroke completion.

However, in the construction where the pressure switch is used, there is caused a problem in that a system cost of the automatic transmission has risen since the pressure switch is expensive in general.

Further, in the construction where the oil pressure is controlled corresponding to the slip amount of the release side friction engagement element, the speed change performance is likely to deteriorate due to prolongation of speed change period since the racing is conversed by controlling the oil pressure so as to maintain an extremely small slip amount.

Moreover, in the construction where the decrease in line pressure is started in accordance with the stroke completion of the engagement side friction engagement element, there is caused a problem in that an occurrence of racing cannot be stably restrained due to an estimation error at a stroke completion period, and also there is a possibility that the decrease in line pressure in a torque phase lowers the response performance of a clutch oil pressure, thereby promoting the further racing.

As disclosed in Japanese Unexamined Patent Publication No. 11-030324, in the construction where the drain timing of the accumulator back pressure in the release side friction engagement element is controlled with the accumulator back pressure in the engagement side as a reference, since oil in the friction engagement element and in an oil passage drains during a vehicle is left without a driver, when the speed change is conducted for the first time after an engine operation start, there is a possibility of a big racing occurrence due to a response delay in oil pressure in the engagement side.

SUMMARY OF THE INVENTION

The present invention has an object of stably restraining an occurrence of racing without cost-up and prolongation of a speed change period in an automatic transmission for carrying out a speed change by controlling a back pressure of an accumulator.

To achieve the above object, according to the present invention, the construction is such that, in an automatic transmission provided with an accumulator disposed in an oil pressure supply pipe in each of friction engagement elements, at least one of the accumulators in the friction engagement element to be engaged and in the friction engagement element to be released, is increased in stepwise in response to a speed change request, when a racing is detected during a speed change.

The other objects and features of this invention will be understood from the following description with reference to the accompanying drawings.

PREFERRED EMBODIMENTS

Figure 1:
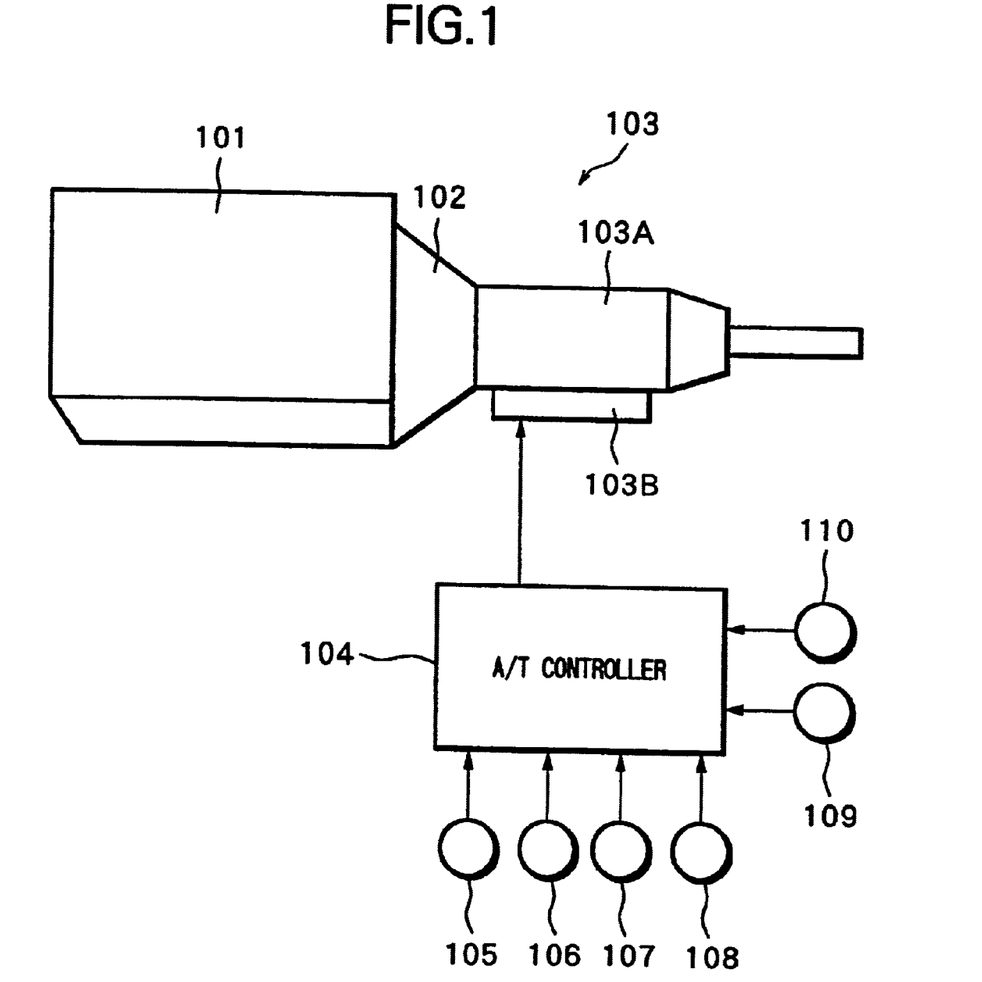
FIG. 1 is a system diagram showing a vehicle drive train.

FIG. 1 shows a vehicle drive train in an embodiment, wherein an output shaft of an engine 101 is connected with an automatic transmission 103 through a torque converter 102 and driving wheels (not shown) of the vehicle are driven for rotation by an output shaft of the automatic transmission 103.

Automatic transmission 103 comprises a transmission mechanism portion 103A and a control valve portion 103B. Control valve portion 103B is controlled by an A/T controller 104.

A/T controller 104 incorporates therein a microcomputer and outputs a control signal to control valve portion 103B by a calculation process of detection signals from an A/T oil temperature sensor 105, an accelerator opening sensor 106, a vehicle speed sensor 107, a turbine rotation sensor 108, an engine rotation sensor 109, an air flow meter 110 and the like.

Figure 2:
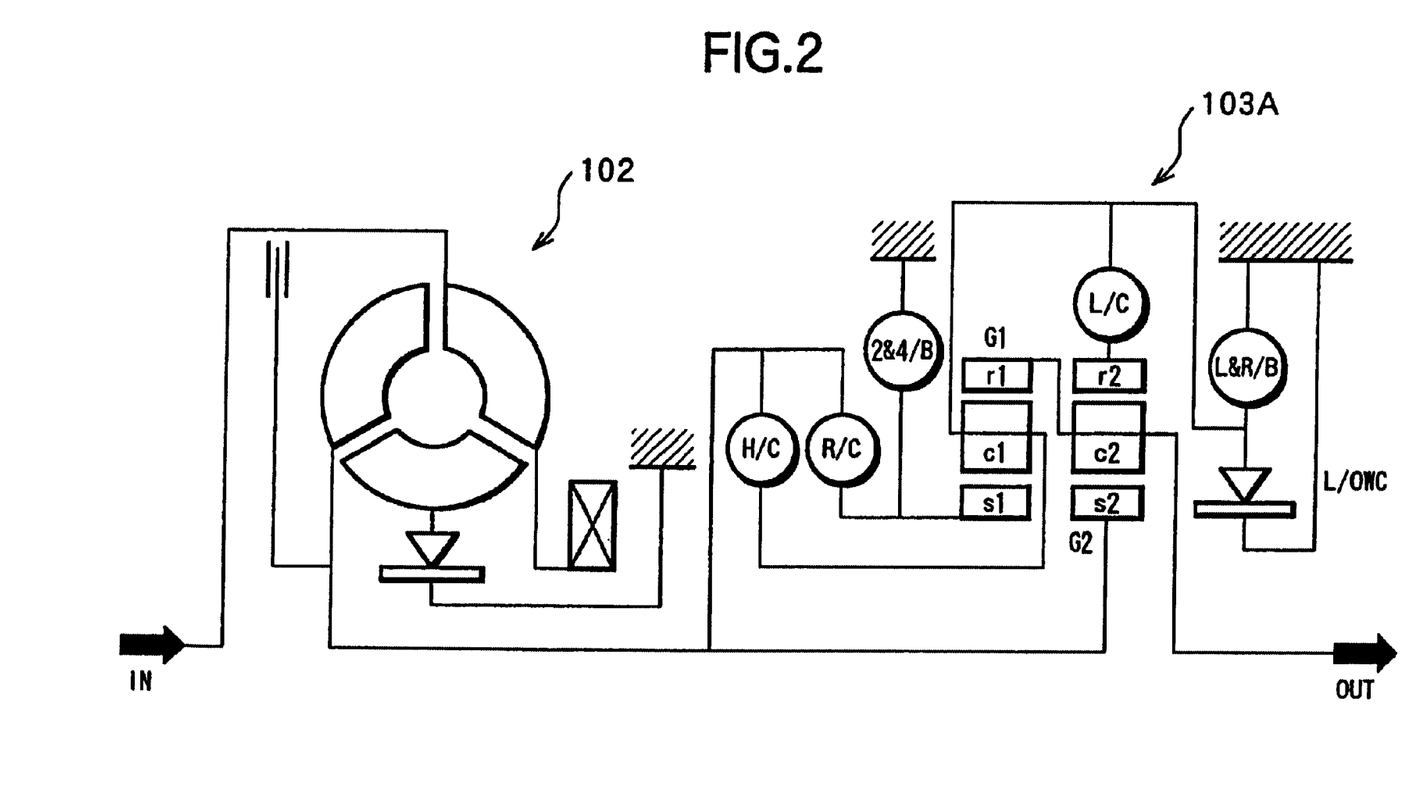
FIG. 2 is a skeleton diagram showing a transmission mechanism.

FIG. 2 is a skeleton showing transmission mechanism portion 103A.

Transmission mechanism portion 103A includes two sets of planetary gears G1, G2, three sets of multiple disc clutches (High Clutch H/C, Reverse Clutch R/C, Low Clutch L/C), a set of brake bands 2 & 4/B, a set of multi plate brakes (low and reverse brakes L & R/B), and a set of one-way clutches L/OWC.

The two sets of planetary gears G1, G2 are simple planetary gears comprising sun gears S1, S2, ring gears r1, r2, and carriers c1, c2, respectively.

Sun gear S1 of planetary gear set G1 is constructed to be connectable to an input shaft IN by reverse clutch R/C and at the same time, to be fixable by brake bands 2 & 4/B.

Sun gear S2 of planetary gear set G2 is connected to input shaft IN directly.

Carrier c1 of planetary gear set G1 is constructed to be connectable to input shaft IN by high clutch H/C, while ring gear r2 of planetary gear set G2 is constructed to be connectable to carrier c1 of planetary gear set G1 by low clutch L/C. Further, carrier c1 of planetary gear set G1 constructed to be fixable by low and reverse brake L & R/B.

Ring gear r1 of planetary gear set G1 and carrier c2 of planetary gear set G2 are integrally connected to an output shaft OUT.

Figure 3:
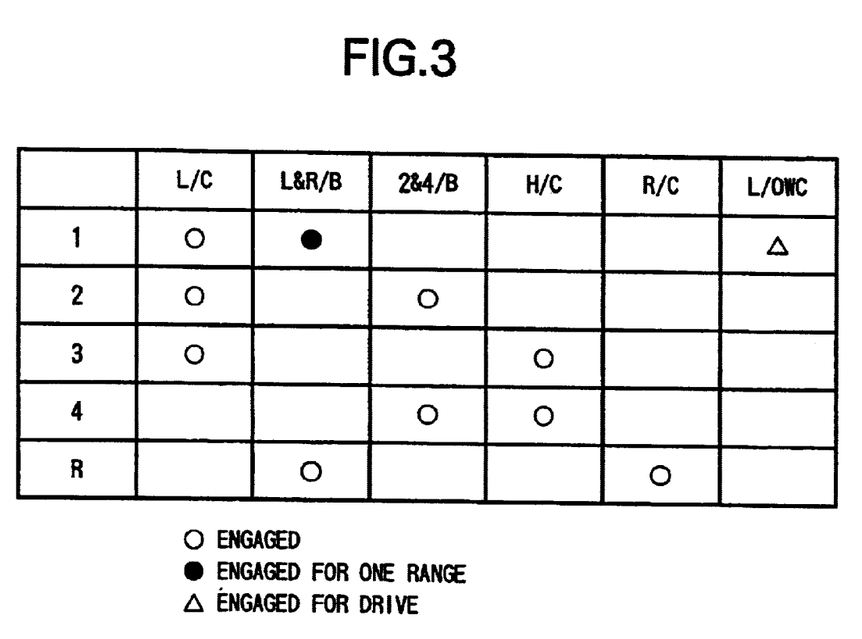
FIG. 3 is a diagram showing a combination of friction engagement elements in each speed change step.

In transmission mechanism portion 103A of the above construction, forward 1-speed to 4-speed and reverse are realized by a combination of engagement states of each clutch and brake as shown in FIG. 3.

In FIG. 3, a circle mark shows an engagement state and a portion with no mark shows a release state. The engagement state of low & reverse brake L & R/B at 1-speed shown in a black circle shows the engagement state only in one range.

As shown in the engagement state combinations of each clutch and brake shown in FIG. 3, at the time of shifting up from 2-speed to 3-speed, release of brake bands 2 & 4/B and engagement of high clutch H/C are performed simultaneously, while maintaining the engagement state of low clutch L/C.

As above, a speed change to replace friction engagement elements by simultaneously controlling engagement and release of clutches and brakes (friction engagement elements) is called as a replacement speed change.

Figure 4:
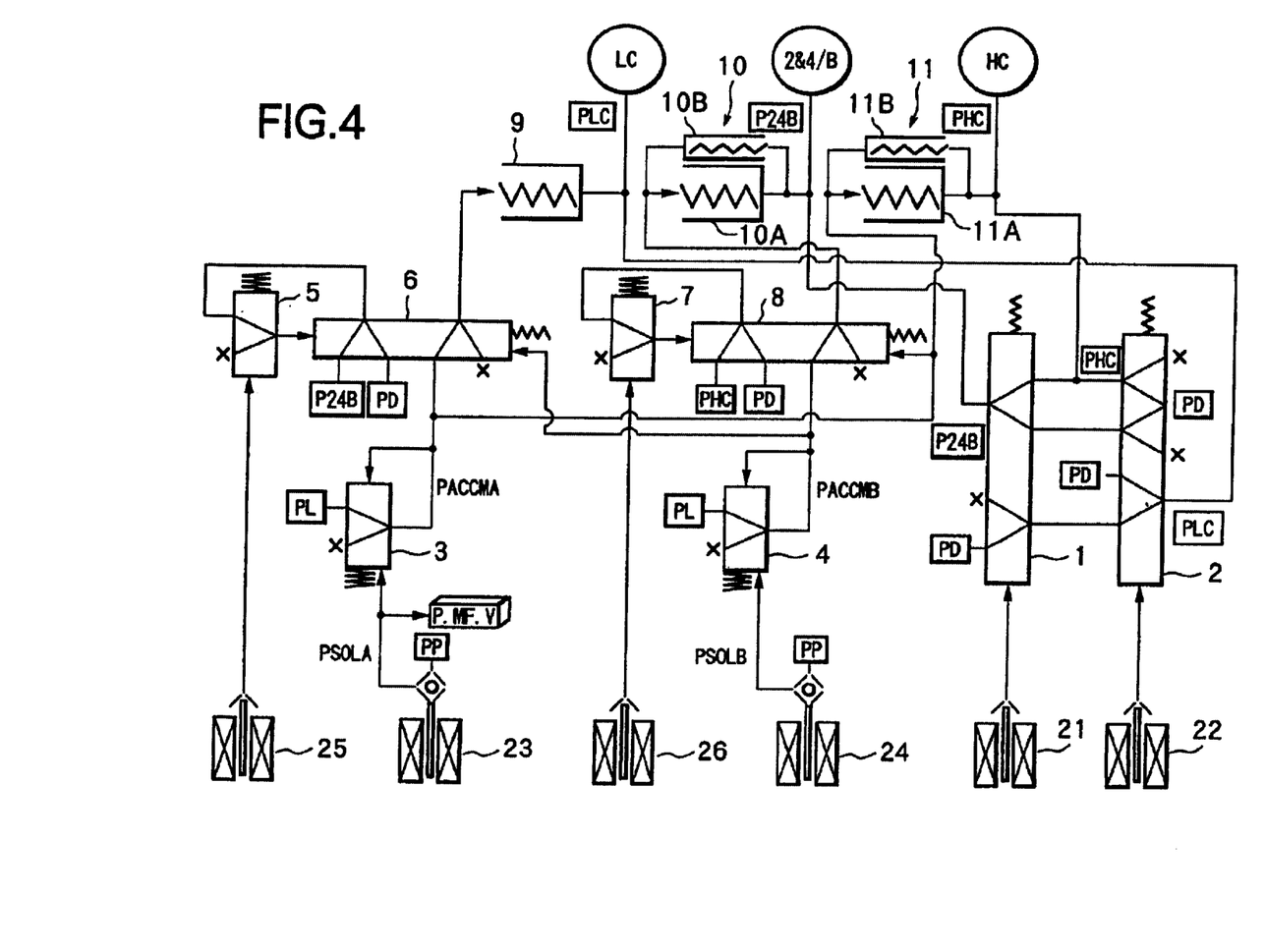
FIG. 4 is an oil pressure circuit diagram showing a control valve portion.

FIG. 4 shows a detail of control valve portion 103B.

In control valve portion 103B shown in FIG. 4 are disposed a shift valve (A) 1, a shift valve (B), an accumulator control valve 3 for L/C & H/C, an accumulator control valve 4 for 2 & 4/B, an L/C timing valve (A) 5, an L/C timing valve (B) 6, a 2 & 4/B timing valve (A) 7, a 2 & 4/B timing valve (B) 8, an L/C accumulator 9, a 2 & 4/B accumulator unit 10, and an H/C accumulator 11.

Shift valve (A) 1 and shift valve (B) 2 perform the switching of oil passage in accordance with a combination of engagement and release corresponding to each speed change step of 1-speed to 4-speed (OD) in response to ON/OFF of a shift solenoid (A) 21 and a shift solenoid (B) 22.

Figure 5:
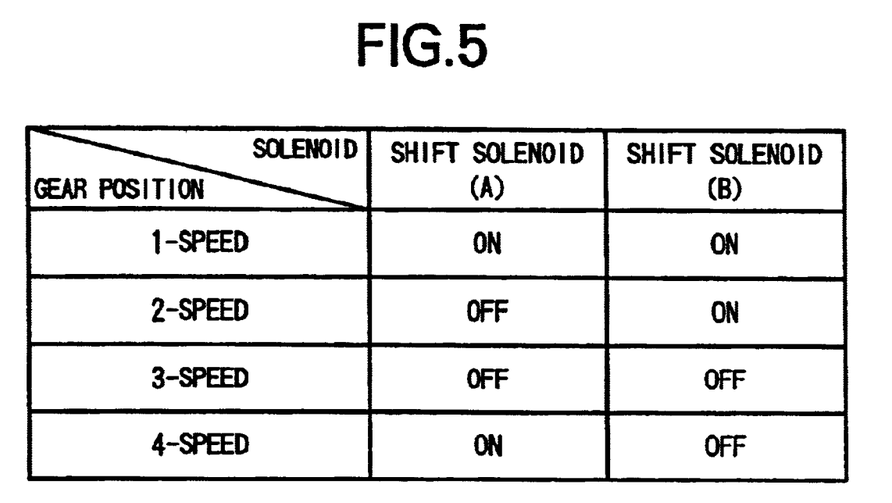
FIG. 5 is a diagram showing an ON/OFF combination of solenoids A, B in each speed change step.

In detail, as shown in FIG. 5, the combination of ON/OFF of shift solenoid (A) 21 and shift solenoid (B) 22 is in advance determined for each speed change step. For example, at the time of shifting up from 2-speed to 3-speed, shift solenoid (B) 22 is switched from ON to OFF, while continuously retaining shift solenoid (A) 21 at OFF.

In OFF state of shift solenoid (A) 21 and shift solenoid (B) 22, a lower side oil passage out of a pair of passages provided by branching one oil passage is selected in shift solenoid (A) 21 and shift solenoid (B) 22 and on the contrary, in ON state of shift solenoid (A) 21 and shift solenoid (B) 22, an upper side oil passage out of the pair of passages is selected.

Accordingly, at the time of shifting up from 2-speed to 3-speed, an oil pressure supply passage to brake bands 2 & 4/B is connected to a drain side (shown in "×" mark in FIG. 4) and at the same time, an oil pressure supply passage to each of low clutch L/C and high clutch H/C is connected with a supply side of D range pressure PD.

Accumulator control valve 3 for L/C & H/C reduces a line pressure PL corresponding to a solenoid pressure PSOLA produced by a duty solenoid 23, and outputs an accumulator control pressure PACCMA for adjusting back pressures of L/C accumulator 9 and H/C accumulator unit 11.

The solenoid pressure PSOLA produced by duty solenoid 23 is also led to a pressure modifier valve (P.MF.V) for adjusting a modifier pressure, being a signal pressure of the line pressure PL produced by a pressure regulator valve not shown.

Accumulator control valve 4 for 2 & 4/B reduces the line pressure PL corresponding to a solenoid pressure PSOLB produced by a 2 & 4/B duty solenoid 24 and outputs an accumulator control pressure PACCMB for adjusting a back pressure of 2 & 4/B accumulator unit 10.

L/C timing valve (A) 5 is a switching valve which switches a signal pressure oil passage in LIC timing valve (A) 6 to a drain side when an L/C timing solenoid 25 is OFF and the signal pressure oil passage to a communication side when ON.

L/C timing valve (A) 6 performs a back pressure control of L/C accumulator 9 at the time of shifting up to 4-speed or at the time of shifting down from 4-speed, that is, at a speed change time to effect the engagement or release of low clutch L/C.

2 & 4/B timing valve (A) 7 is a switching valve which switches a signal pressure oil passage in 2 & 4/B timing valve (B) 8 to a drain side when a 2 & 4/B timing solenoid 26 is OFF and to a communication side when ON.

2 & 4/B timing valve (B) 8 performs a back pressure control of 2 & 4/B accumulator 10 at the time of shifting up to 3-speed or at the time of shifting down from 3-speed, that is, at a speed change time to effect the engagement or release of brake bands 2 & 4/B.

To a back pressure chamber of L/C accumulator 9, the accumulator control pressure PACCMA is led through L/C timing valve (A) 6 so as to make the engagement and release of the low clutch L/C smooth.

To a back pressure chamber of 2 & 4/B accumulator unit 10, the accumulator control pressure PACCMB is led through 2 & 4/B timing valve (B) 8 so as to make the engagement and release of brake bands 2 & 4/B smooth.

2 & 4/B accumulator unit 10 comprises two accumulators 10A, 11B, in each of which a piston and a spring are incorporated into a cylinder. Directions of the springs are set to be opposite to each other with respect to a back pressure, to obtain two-step accumulator characteristics with different shelf pressure levels.

To a back pressure chamber of H/C accumulator unit 11, the accumulator control pressure PCCMA is led directly to make the engagement and release of the high clutch H/C smooth.

This H/C accumulator unit 11 also comprises two accumulators 11A, 11B, in each of which a piston and a spring are incorporated into a cylinder. Directions of the springs are set to be opposite to each other with respect to a back pressure, to obtain two-step accumulator characteristics with different shelf pressure levels.

Here, in a state where a D range is selected, A/T controller 104 outputs an ON or OFF command to shift solenoid (A) 21 and shift solenoid (B) 22 according to the ON or OFF command of the shift solenoid for each speed change step shown in FIG. 5 so as to change to the speed change step corresponding to a shift schedule previously set based on a throttle opening degree and a vehicle speed.

The operation at a speed change, for example at the time of shifting up from 2-speed to 3-speed, will be explained with reference to FIG. 6.

At the time of shifting up from 2-speed to 3-speed, the D range pressure PD is continuously supplied to the low clutch L/C by switching shift solenoid (B) 22 from ON to OFF while continuously keeping shift solenoid (A) 21 OFF.

Further, the oil pressure supply passage to brake bands 2 & 4/B is drained and also the D range pressure PD is started to be supplied to the high clutch H/C which has been drained. As a result, by the release of brake bands 2 & 4/B and the engagement of the high clutch H/C, the engagement and release of friction engagement elements is switched to that at 3-speed state so that the speed change step is shifted up from 2-speed to 3-speed.

When brake bands 2 & 4/B are released accompanying the up-shift of from 2-speed to 3-speed, timing to drain the back pressure of 2 & 4/B accumulator unit 10 is controlled by 2 & 4/B timing valves 7, 8.

Figure 6:
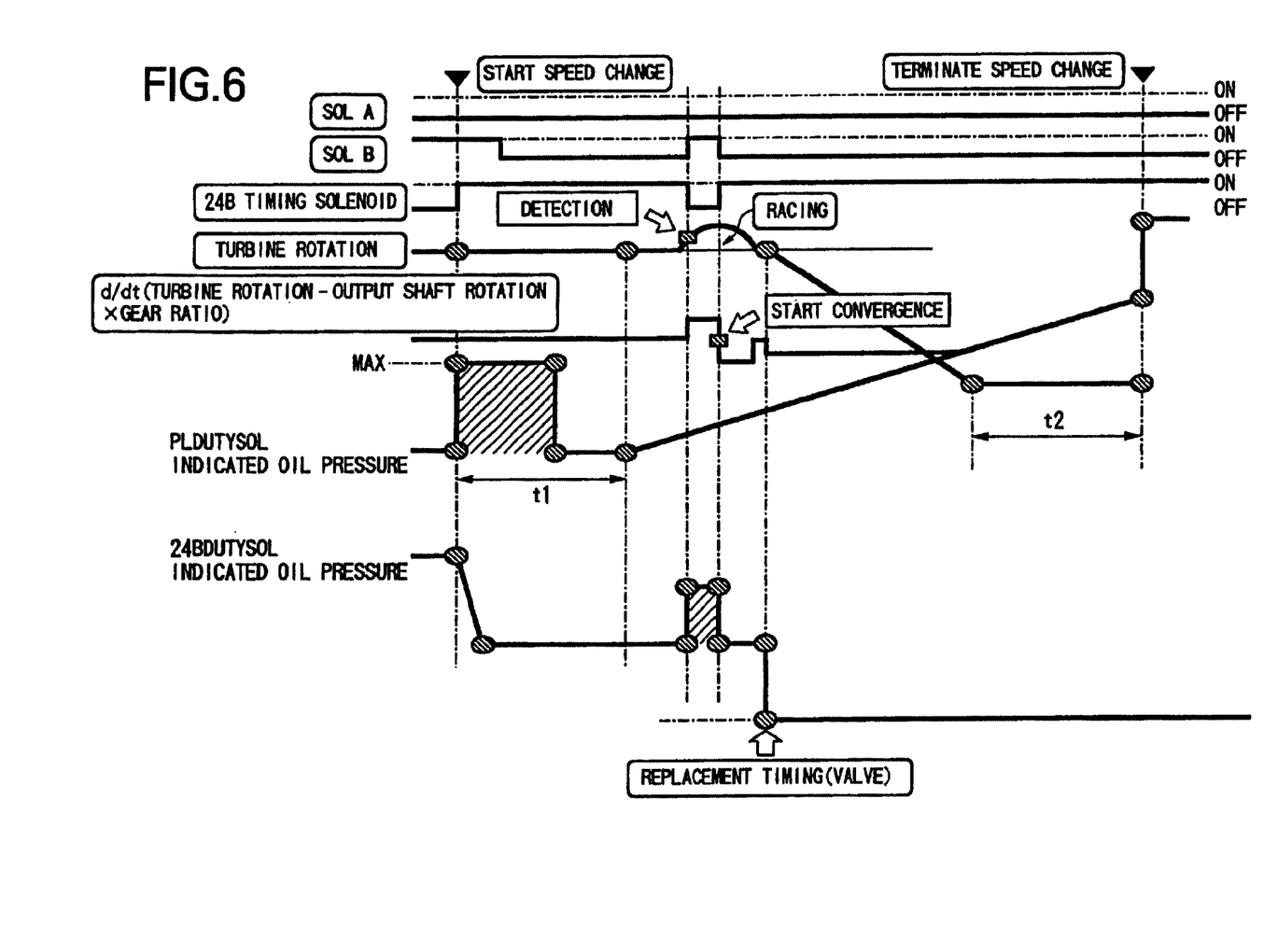
FIG. 6 is a time chart showing control characteristics at up-shift timing of 2-speed→3-speed.

As shown in a time chart in FIG. 6, at the time of shifting up from 2-speed to 3-speed, 2 & 4/B timing solenoid 26 is switched from OFF to ON by switching shift solenoid (B) 22 from ON to OFF while continuously keeping shift solenoid (A) 21 OFF.

When 2 & 4/B timing solenoid 26 is OFF, a signal pressure to 2 & 4/B timing valve (B) 8 is drained, so that the accumulator control pressure PACCMB as it is, is led to the back pressure chamber of 2 & 4/B accumulator unit 10 by a spring urging 2 & 4/B timing valve (B) 8 in the left direction in FIG. 4, thereby prohibiting a drain process by 2 & 4/B timing valve (B) 8.

On the other hand, when 2 & 4/B timing solenoid 26 is switched ON, 2 & 4/B timing valve (A) 7 switches the signal pressure oil passage from the drain side to the communication side so that the engagement side high clutch pressure PHC is supplied as a signal pressure for acting on the 2 & 4/B accumulator back pressure to be drained, thereby making the drain process a pressure balance be possible.

The engagement side accumulator control pressure PACCMA is supplied to 2 & 4/B timing valve (B) 8 as a signal pressure for acting on the 2 & 4/B accumulator back pressure to be supplied.

Accordingly, at timing when a differential pressure AP between the accumulator control pressure PACCMA as the engagement side accumulator back pressure and the high clutch pressure PHC as an engagement side operation pressure reaches a set differential pressure, a spool of 2 & 4/B timing valve (B) 8 is switched to a side to drain the 2 & 4/B accumulator back pressure.

When the spool of 2 & 4/B timing valve (B) 8 is switched to the side to drain the 2 & 4/B accumulator back pressure, the D range pressure PD is started to be supplied as a signal pressure for acting on the 2 & 4/B accumulator back pressure to be drained, thereby holding the drain state of the 2 & 4/B accumulator back pressure.

The operation pressure of engagement side high clutch H/C rises up after completion of a clutch piston stroke, and with the operation pressure rise, shows a first shelf pressure characteristic by a piston stroke operation of accumulator 11B, and further, transfers to a second shelf pressure characteristic by the piston stroke operation of accumulator 11A. As the stroke operation by accumulator 11A is completed, the engagement pressure rises up to a line pressure level without stopping and the high clutch H/C is engaged.

On the other hand, the pressure of 2 & 4/B release side brake band is reduced without stopping from the engagement pressure as the line pressure level to the accumulator back pressure level. When the high clutch pressure PHC as the operation pressure of the engagement side reaches a switching pressure of 2 & 4/B timing valve (B) 8, the 2 & 4/B accumulator back pressure is drained so that a brake band pressure P24B is reduced at a large incline to a release pressure level, thereby releasing brake bands 2 & 4/B.

At the above release control time, a solenoid pressure PSOLB made, in advance, by 2 & 4/B duty solenoid 24 is reduced from the line pressure PL as the maximum pressure to a target solenoid pressure PSOLB corresponding to an input shaft torque at that time, and then, shift solenoid (B) 22 is switched from ON to OFF, so that the engagement pressure of brake bands 2 & 4/B is reduced to the accumulator back pressure level corresponding to the input shaft torque.

Similar to the above, at the time of shifting up from 3-speed to 4-speed when the low clutch L/C is released and brake bands 2 & 4/B are engaged, a drain timing control of low clutch accumulator back pressure is performed at LIC timing valve (A) 6.

As described in the above, if the drain timing of accumulator back pressure of the release side friction engagement element is controlled, it is possible to control the drain timing optimally despise of variations in the friction engagement element or oil pressure fluctuations. However, at a first speed change after a vehicle is left for long hours, it is impossible to obtain a usual oil pressure response since oil inside a clutch pack is drained completely. Therefore, it is likely that, at an engagement and release replacement, a torque capacity becomes lack and a racing of engine possibly occurs.

Figure 7:
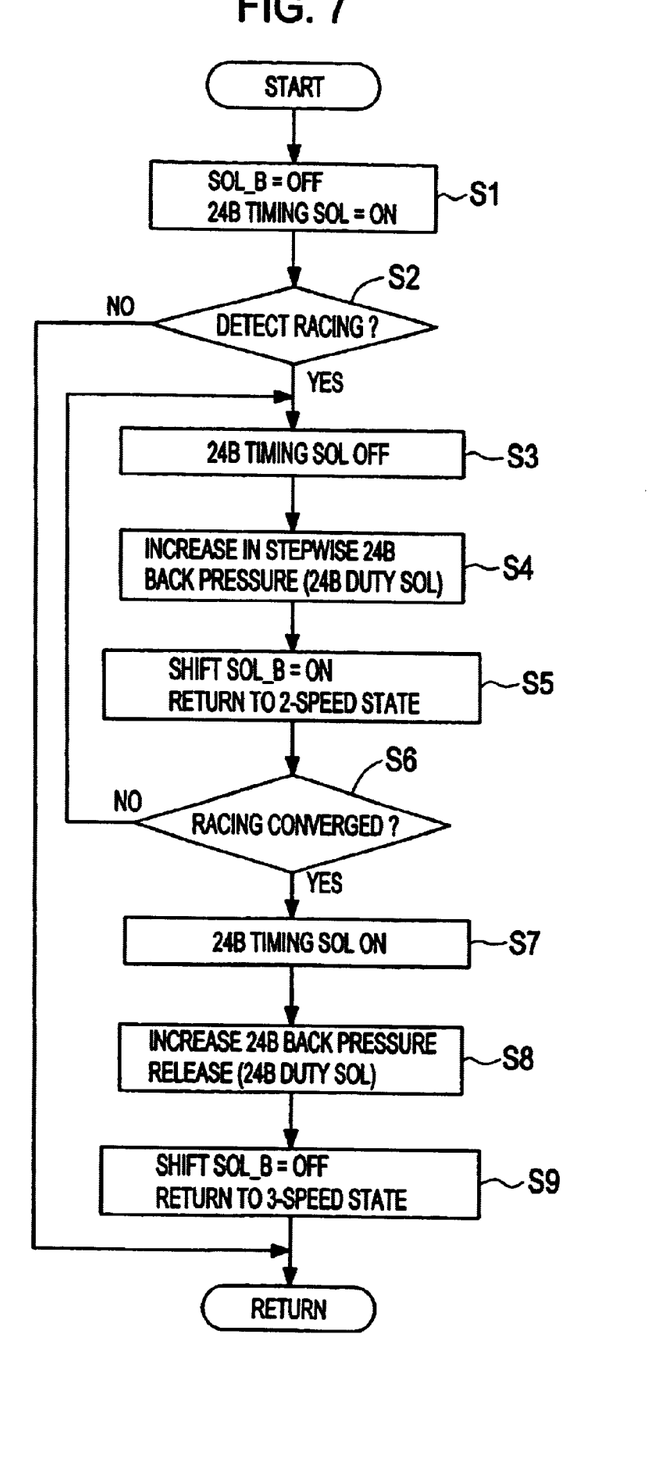
FIG. 7 is a flowchart showing a first embodiment of a control for restraining a racing during a speed change.

According to the present invention, the racing is restrained by a control shown in a flowchart in FIG. 7. The racing restraining control will be explained with reference to the time chart in FIG. 6.

The flowchart in FIG. 7 is executed at an up-shift demand of from 2-speed to 3-speed. At Step S1, in order to release brake bands 2 & 4/B and engage the high clutch H/C, shift solenoid (B) 22 is switched from ON to OFF and 2 & 4/B timing solenoid 26 is switched to ON.

At Step S2, it is judged whether or not the racing of engine occurs during the up-shift of from 2-speed to 3-speed by the above drain timing control.

The judgment of racing occurrence is performed in such a manner that a reference turbine rotation speed NtS is calculated based on the detection signal from vehicle speed sensor 107 for taking out a rotation signal from the output shaft in the automatic transmission and a gear ratio in 2-speed prior to speed change, and the racing occurrence is detected when an actual turbine rotation speed Nt detected by turbine rotation sensor 108 exceeds the sum of the reference turbine rotation speed NtS+a predetermined value HYS (1).

Also, the racing occurrence may be detected in such a manner that the gear ratio (gear ratio=input shaft rotation speed/output shaft rotation speed) is calculated based on the detection signal from vehicle speed sensor 107 and the turbine rotation speed Nt detected by turbine rotation sensor 108, and the racing occurrence is detected when the gear ratio exceeds a reference gear ratio (1) set on the basis of the gear ratio in 2-speed prior to speed change.

When, the racing occurrence is detected at Step S2, the control proceeds to Step S3, wherein 2 & 4/B timing solenoid 26 is switched to OFF, to thereby prevent a drain of release side 2 & 4/B accumulator back pressure by the operation of 2 & 4/B timing valve (B) 8.

Figure 8:
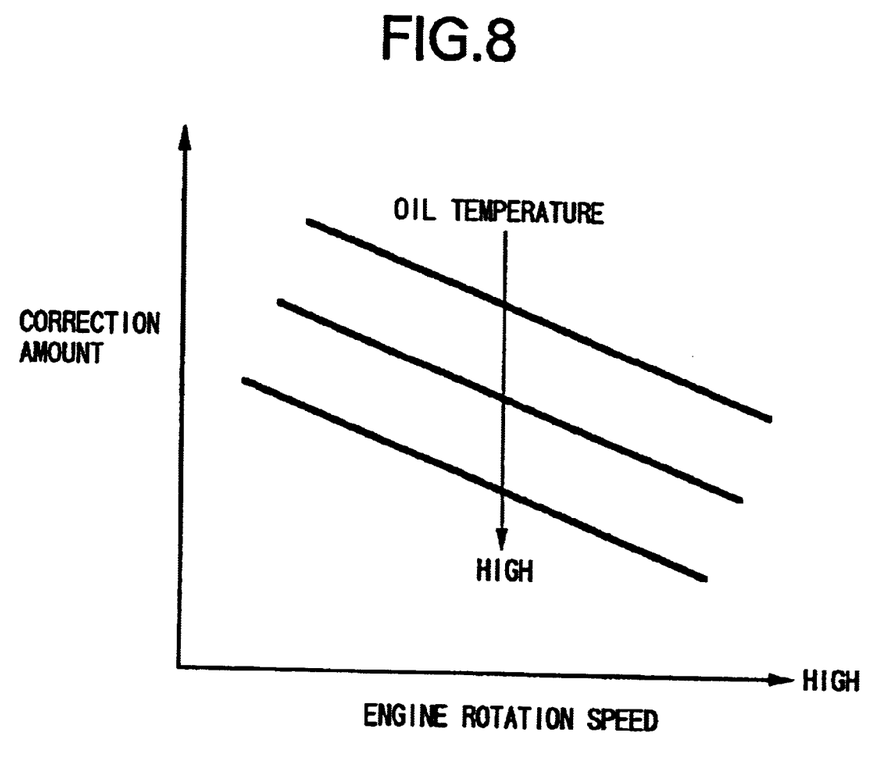
FIG. 8 is a graph showing characteristics of a correction amount of a back pressure.

At Step 54, a control duty of 2 & 4/B duty solenoid 24 is corrected to increase the 2 & 4/B accumulator back pressure. To be specific, a base duty corresponding to the input shaft torque is corrected in stepwise with a predetermined correction amount. The correction value, as shown in FIG. 8, is set in accordance with an engine rotation speed and an oil temperature, so that the correction amount gets larger as the engine rotation speed is lower and the oil temperature is lower.

In this embodiment, an oil pump to supply an operation oil is driven by the engine and a discharge amount of the oil pump gets smaller as the engine rotation speed is lower. Therefore, as the engine rotation speed is lower, the correction amount is made to be larger, thereby increasing the release side torque capacity at quickly.

When a temperature of operation oil is low, the oil pressure response gets slow. Therefore, the correction amount is made to be larger as the oil temperature is lower, thereby increasing the release side torque capacity quickly.

At Step S5, in order to return the condition back to the condition of 2-speed in which the D range pressure PD is supplied, from the condition in which the oil pressure supply passage of brake bands 2 & 4/B is drained, shift solenoid (B) 22 which has been switched to OFF in accordance with the up-shift demand of from 2speed to 3-speed, is switched ON.

As described above, the 2 & 4/B accumulator back pressure is increased and shift solenoid (B) 22 is switched to ON so as to bring the D range pressure PD into a condition to be supplied to brake bands 2 & 4/B. Then, the engagement pressure of release side 2 & 4/B brake band is increased to converge the racing state due to the lack of torque capacity.

An oil amount discharged from the clutch pack of brake bands 2 & 4/B can be restricted to some degree only by increasing the 2 & 4/B accumulator back pressure. But it is insufficient for a quick convergence of the racing, therefore the D range pressure PD is supplied to the clutch pack of brake bands 2 & 4/B by switching shift solenoid (B) 22 to ON.

At Step S6, it is judged whether or not the racing is converged.

The racing convergence can be detected when a differential value of a deviation between the turbine rotation speed Nt and the reference turbine rotation speed NtS becomes less than a predetermined value HYS (2) (for example, 0).

According to this, it can be detected, as the racing convergence, a time when a tendency for the turbine rotation speed Nt to be apart from the reference turbine rotation speed NtS is changed to a tendency to return back to the reference turbine rotation speed NtS.

Also, the racing convergence may also be detected in such a manner that the gear ratio is calculated from the signal from vehicle speed sensor 107 and the turbine rotation speed Nt detected by turbine rotation sensor 108, to detect the racing convergence when the calculated gear ratio becomes less than a reference gear ratio (2) set on the basis of the gear ratio in 2-speed prior to speed change.

In case the racing convergence is detected based on the differential value of the deviation between the turbine rotation speed Nt and the reference turbine rotation speed NtS, a point of time when the racing is reversed to a convergence tendency can be detected with a good response, so that the racing can be converged in a short time while avoiding an excess correction. Accordingly, this is more preferable than the detection of racing convergence based on the gear ratio.

When the racing convergence is detected at Step S6, the control proceeds to Steps S7–9 for returning back the condition to the normal speed change condition of from 2-speed to 3-speed.

At Step S7, 2 & 4/B timing solenoid 26 is switched to ON, to make the release side 2 & 4/B accumulator back pressure to be drained by the operation of 2 & 4/B timing valve (B) 8.

At Step S8, the increase control of the 2 & 4/B accumulator back pressure is stopped, to return back to a base value.

At Step S9, shift solenoid (B) 22 is switched to ON, to return back to 3-speed state in which the oil supply passage of brake bands 2 & 4/B is drained.

If the shift solenoid is returned back to the previous control state of 2-speed to increase the 2 & 4/B accumulator back pressure when the racing occurrence is detected, an engagement pressure (torque capacity) of brake bands 2 & 4/B can be increased with a good response to converge the racing in a short time.

The increase correction amount of the 2 & 4/B accumulator back pressure is set in accordance with the engine rotation speed correlating to the discharge amount of oil pump and the oil temperature showing a viscosity of operation oil, so that the engagement pressure (torque capacity) of brake bands 2 & 4/B can be increased by an amount enough for the racing convergence without overshooting.

Since the racing is estimated to occur due to a delay of oil pressure response in the engagement side, it is preferable that the high clutch H/C of the engagement side is pre-charged by controlling the back pressure. The pre-charge control will be explained according to a flowchart in FIG. 9.

Figure 9:
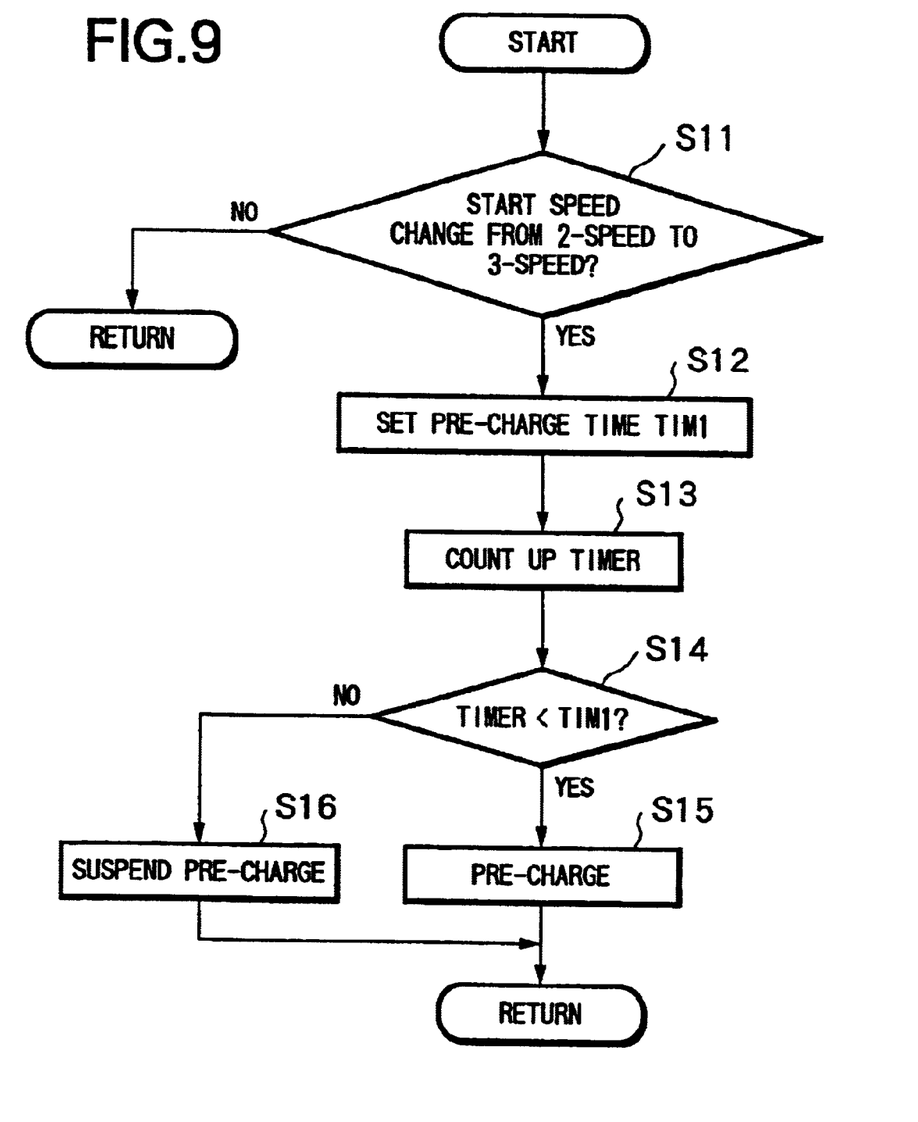
FIG. 9 is a flowchart showing a pre-charge control to an engagement side friction engagement element.

In the flowchart in FIG. 9, at Step S11, it is judged whether or not it is a start time of the up-shift of from 2-speed to 3-speed. When the up-shift of from 2-speed to 3-speed is started, the control proceeds to Step S12.

At Step S12, a pre-charge time TIMI is set corresponding to the engine rotation speed and the oil temperature.

Figure 10:
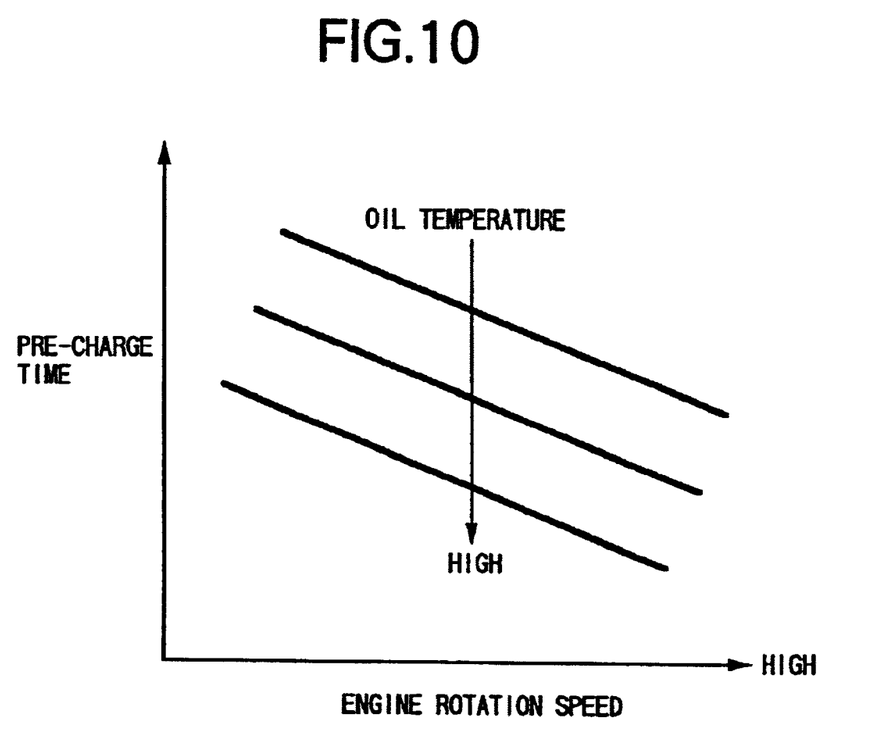
FIG. 10 is a graph showing characteristics of a pre-charging period in the pre-charge control.

The pre-charge time TIMI is set to be longer as the engine rotation speed is lower and the oil temperature is lower as shown in FIG. 10.

This is because, similarly to the setting characteristic of the correction amount, when the engine rotation speed is lower, the discharge amount of oil pump becomes smaller and when the operation oil temperature is lower, the oil pressure response becomes slower.

At Step S13, a timer for measuring an elapsed time after the up-shift of from 2-speed to 3-speed is started, is counted up, and at Step S14, it is judged whether or not the measurement time by the timer is shorter than the pre-charge time TIMI.

When the measurement time by the timer is shorter than the pre-charge time TIMI, the control proceeds to Step S15, wherein the pre-charge to the high clutch H/C of the engagement side is executed.

The pre-charge is executed by increasing the H/C accumulator back pressure to the maximum pressure. Specifically, the accumulator control pressure PACCMA is set to the line pressure being the maximum pressure by controlling PL duty solenoid 23.

When the pre-charge for increasing the H/C accumulator back pressure to the maximum pressure is continuously executed for the pre-charge time TIMI, the control proceeds from Step S14 to Step S16, wherein the pre-charge is stopped to return the H/C accumulator back pressure to the value corresponding to the input shaft torque.

Figure 11:
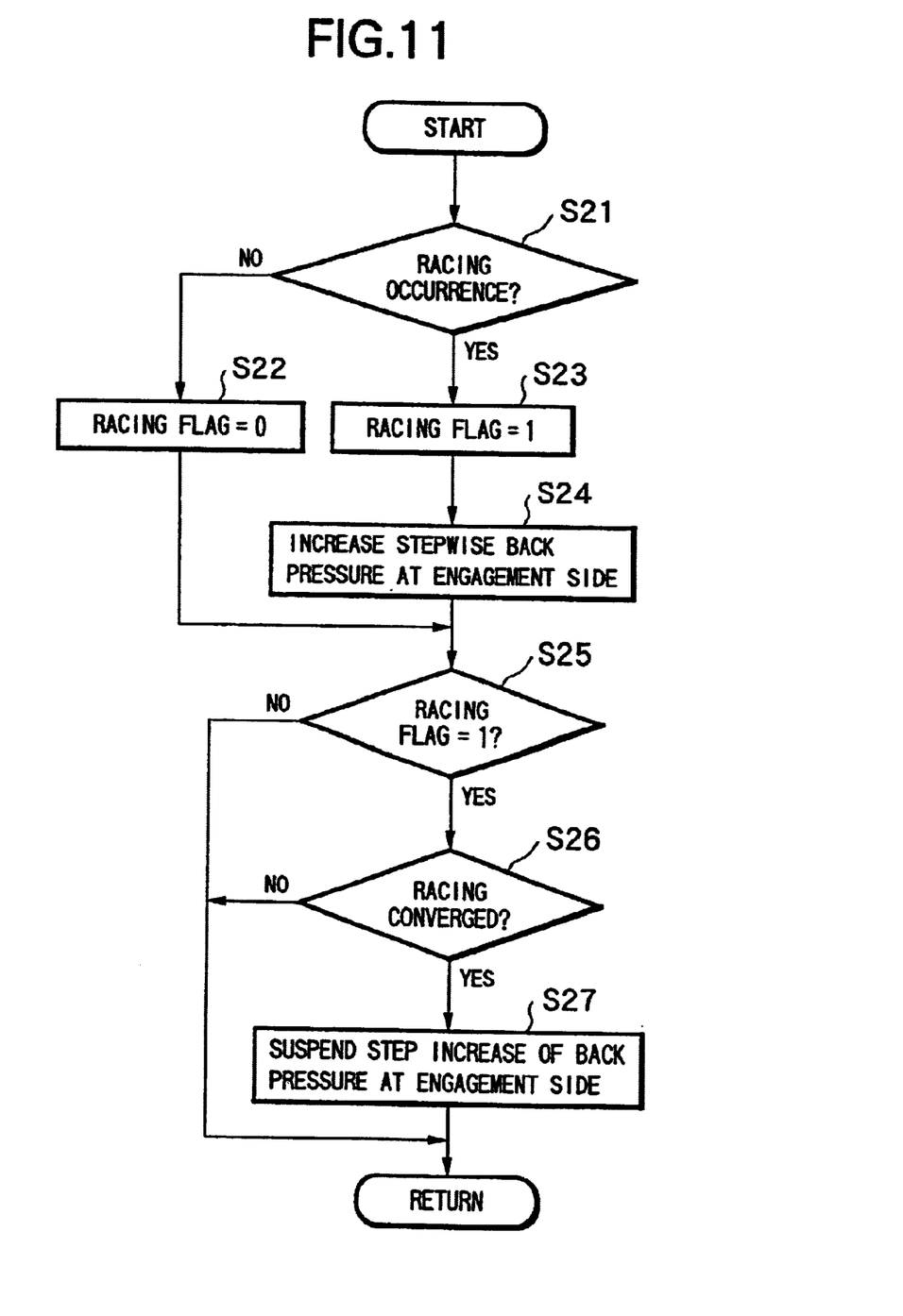
FIG. 11 is a flowchart showing a second embodiment of the control for restraining a racing during the speed change.

Next, a second embodiment of control at a racing will explained according to a flowchart in FIG. 11.

The flowchart in FIG. 11 is executed accompanied by a start of replacement speed change. Firstly, at Step S21, it is detected whether or not the racing of engine occurred similarly to Step S2.

The control proceeds to Step S22, wherein a racing flag is set as 0 until the racing occurrence is detected at Step S21.

On the other hand, when the racing occurrence is detected at Step S21, the control proceeds to Step S23, wherein the racing flag is set as 1 and the control proceeds to Step S24, wherein the accumulator back pressure of the engagement side friction engagement element is corrected to be increased in stepwise.

For example, at the time of shifting up from 2-speed to 3-speed, since the release of bands 2 & 4/B and the engagement of high clutch H/C are executed, the high clutch H/C corresponds to the engagement side friction engagement element and a control duty (an indication oil pressure of the accumulator control pressure PACCMA) of PL duty solenoid 23 for controlling the back pressure of high clutch H/C is corrected to be increased in stepwise.

To be specific, the base duty corresponding to the input shaft torque and the like is corrected by a predetermined correction amount. The correction amount is set in accordance with the engine rotation speed and the oil temperature similarly to the first embodiment shown in the flowchart in FIG. 7, and as the engine rotation speed is lower, the correction amount becomes larger (see FIG. 8).

At Step S25, it is judged whether or not the racing flag is set as 1.

When the racing flag is set as 1, the control proceeds to Step S26, wherein it is judged whether or not the racing is converged, similarly to Step S6.

When the racing convergence is detected at Step S26, the control proceeds to Step S27, wherein the stepwise increase correction of the accumulator back pressure of the engagement side friction engagement element is stopped.

For example, if it is the time of shifting up from 2-speed to 3-speed, the increase correction of the control duty of PL duty solenoid 23 for controlling the accumulator back pressure of high clutch H/C of the engagement side is stopped, to return the control duty to the base duty.

As described above, when the racing occurrence is detected, the accumulator back pressure of the engagement side friction engagement element is increased in stepwise, the engagement pressure (torque capacity) of the engagement side friction engagement element can be increased with a good response to thereby reliably converge the racing in a short time.

The increase correction amount of the accumulator back pressure of the engagement side friction engagement element is set in accordance with the engine rotation speed correlating to the discharge amount of oil pump and the oil temperature showing the viscosity of operation oil, so that the engagement pressure of the engagement side friction engagement element can be increased by an amount enough for the racing convergence without overshooting.

The entire contents of Japanese Patent Application No. 2000-268997 filed Sep. 5, 2000 and Japanese Patent Application No. 2000-268998 filed Sep. 5, 2000 are incorporated herein by reference.

What is claimed is:

1. An apparatus for controlling an automatic transmission comprising:
   a plurality of friction engagement elements;
   oil pressure supply passages each for supplying an oil pressure to a respective one of said plurality of friction engagement elements;
   an accumulator disposed in each said oil supply passage;
   a shift valve assembly for switching the oil supply to said plurality of friction engagement element;
   a control valve assembly which adjusts a back pressure of each said accumulator; and
   a controller for controlling said shift valve assembly and said control valve assembly to perform a speed change,
   wherein said controller comprises:
      a racing detection unit for detecting a racing of engine during said speed change; and
      an accumulator back pressure control unit for increasing in stepwise an accumulator back pressure of at least one of the friction engagement element of an engagement side and the friction engagement element of a release side when said racing is detected by said racing detection unit, and
   said accumulator back pressure control unit comprises:
      a rotation speed detection unit for detecting an engine rotation speed; and
      a correction amount setting unit for setting an increase correction amount of the accumulator back pressure in accordance with said engine rotation speed.

2. An apparatus for controlling an automatic transmission comprising:
   a plurality of friction engagement elements;
   oil pressure supply passages each for supplying an oil pressure to a respective one of said plurality of friction engagement elements;
   an accumulator disposed in each said oil supply passage;
   a shift valve assembly for switching the oil supply to said plurality of friction engagement element;
   a control valve assembly which adjusts a back pressure of each said accumulator; and
   a controller for controlling said shift valve assembly and said control valve assembly to perform a speed change,
   wherein said controller comprises:
      a racing detection unit for detecting a racing of engine during said speed change; and
      an accumulator back pressure control unit for increasing in stepwise an accumulator back pressure of at least one of the friction engagement element of an engagement side and the friction engagement element of a release side when said racing is detected by said racing detection unit, and said accumulator back pressure control unit comprises:
an oil temperature detection unit for detecting an operation oil temperature of said automatic transmission; and
a correction amount setting unit for setting an increase correction amount of the accumulator back pressure in accordance with said operation oil temperature.

3. An apparatus for controlling an automatic transmission according to claims 1 or 2,
wherein said accumulator back pressure control unit increases the accumulator back pressure of said friction engagement element of the release side in stepwise and supplies the oil pressure to said friction engagement element of the release side.

4. An apparatus for controlling an automatic transmission according to claims 1 or 2,
wherein said accumulator back pressure control unit increases the accumulator back pressure of said friction engagement element of the engagement side in stepwise.

5. An apparatus for controlling an automatic transmission according to claim 1,
wherein said controller comprises;
a pre-charge control unit for controlling the accumulator back pressure of said friction engagement element of the engagement side to a maximum oil pressure for a predetermined period after a speed change start.

6. An apparatus for controlling an automatic transmission according to claim 5,
wherein said pre-charge control unit comprises:
a period setting unit for setting said predetermined period in said pre-charge control unit in accordance with said engine rotation speed.

7. An apparatus for controlling an automatic transmission according to claim 5,
wherein said pre-charge control unit comprises:
an oil temperature detection unit for detecting an operation oil temperature of said automatic transmission; and
a period setting unit for setting said predetermined period in said pre-charge control unit in accordance with said operation oil temperature.

8. An apparatus for controlling an automatic transmission according to claim 2, wherein said controller comprises:
A pre-charge control unit for controlling the accumulator back pressure of said friction engagement element of the engagement side to a maximum oil pressure for a predetermined period after a speed change start.

9. An apparatus for controlling an automatic transmission according to claim 8, wherein said pre-charge control unit comprises:
an engine rotation speed detection unit for detecting an engine rotation speed; and
a period setting unit for setting said predetermined period in said pre-charge control unit in accordance with said engine rotation speed.

10. An apparatus for controlling an automatic transmission according to claim 8, wherein said pre-charge control unit comprises:
a period setting unit for setting said predetermined period in said pre-charge control unit in accordance with said operation oil temperature.

11. An apparatus for controlling an automatic transmission comprising:
a plurality of friction engagement elements;
oil pressure supply passages each for supplying an oil pressure to a respective one of said plurality of friction engagement elements; an accumulator disposed in each said oil supply passage;
a shift solenoid arrangement for switching the oil supply/drain to each of said friction engagement elements in an ON/OFF way;
a duty solenoid arrangement for controlling a back pressure of said accumulators;
a timing valve for determining timing to drain an accumulator back pressure of a friction engagement element of a release side in response to a rise of an operation pressure of a friction engagement element of an engagement side with a speed change;
a timing solenoid for switching a permission/prohibition of a drain process in said timing valve; and
a controller for controlling said shift solenoid, said duty solenoid, and said timing solenoid, to perform the speed change,
wherein said controller comprises a racing detection unit for detecting a racing of an engine during said speed change, and
wherein, when an occurrence of racing is detected during the speed change, said controller returns said shift solenoid back to a state prior to the speed change, prohibits the drain process in said timing valve by said timing solenoid and increases in stepwise the accumulator back pressure of the friction engagement element of release side, while when a convergence of racing is detected, said controller returns said shift solenoid back to a state corresponding to a speed change request, permits the drain process in said timing valve by said timing solenoid and decreases in stepwise the accumulator back pressure of the friction engagement element of said release side.

12. A method for controlling an automatic transmission comprising the steps of:
detecting a racing of engine during a speed change; and
increasing in stepwise an accumulator back pressure of at least one of a friction engagement element of an engagement side and a friction engagement element of a release side, when said racing is detected,
wherein said step of increasing the accumulator back pressure comprises the steps of:
detecting an engine rotation speed; and
setting an increase correction amount of the accumulator back pressure in accordance with said engine rotation speed.

13. A method for controlling an automatic transmission comprising the steps of:
detecting a racing of engine during a speed change; and
increasing in stepwise an accumulator back pressure of at least one of a friction engagement element of an engagement side and a friction engagement element of a release side, when said racing is detected,
wherein said step of increasing the accumulator back pressure comprises the steps of:
detecting an operation oil temperature of said automatic transmission; and
setting an increase correction amount of the accumulator back pressure in accordance with said operation oil temperature.

14. A method for controlling an automatic transmission according to claims 12 or 13,
   wherein said step of increasing the accumulator back pressure comprises the steps of:
   increasing the accumulator back pressure of said friction engagement element of a release side in stepwise; and
   supplying the oil pressure to said friction engagement element of a release side.

15. A method for controlling an automatic transmission according to claims 12 or 13,
   wherein said step of increasing the accumulator back pressure increases the accumulator back pressure of said friction engagement element of an engagement side in stepwise.

16. A method for controlling an automatic transmission according to claims 12 further comprising the step of:
   controlling the accumulator back pressure of said friction engagement element of engagement side to a maximum oil pressure for a predetermined period after a speed change start.

17. A method for controlling an automatic transmission according to claim 16,
   wherein said step of controlling the accumulator back pressure to a maximum oil pressure comprises the steps of:
   setting said predetermined period in accordance with said engine rotation speed.

18. A method for controlling an automatic transmission according to claim 16,
   wherein said step of controlling the accumulator back pressure to a maximum oil pressure comprises the steps of:
   detecting an operation oil temperature of said automatic transmission; and
   setting said predetermined period in accordance with said operation oil temperature.

19. A method for controlling an automatic transmission according to claim 13, further comprising the step of:
   Controlling the accumulator back pressure of said friction engagement element of engagement side to a maximum oil pressure for a predetermined period after a speed change start.

20. A method for controlling an automatic transmission according to claim 19, wherein said step of controlling the accumulator back pressure to a maximum oil pressure comprises the steps of:
   detecting an engine rotation speed; and
   setting said predetermined period in accordance with said engine rotation speed.

21. A method for controlling an automatic transmission according to claim 19, wherein said step of controlling the accumulator back pressure to a maximum oil pressure comprises the steps of:
   setting said predetermined period in accordance with said operation oil temperature.

* * * * *